United States Patent [19]

Prelat et al.

[11] Patent Number: 5,443,323
[45] Date of Patent: Aug. 22, 1995

[54] MOUNTING DEVICE FOR A MOBILE PART OF A HEADLAMP

[75] Inventors: Alain Prelat, Paris; Gérard Billot, Montfermeil; Hervé Lequinio, Paris, all of France

[73] Assignee: Valeo Vision, Bobigny, France

[21] Appl. No.: 65,184

[22] Filed: May 21, 1993

[30] Foreign Application Priority Data

May 25, 1992 [FR] France ................ 92 06364

[51] Int. Cl.6 ................................................ F16B 2/02
[52] U.S. Cl. ................................ 403/289; 403/135; 403/263; 403/319
[58] Field of Search ............... 403/289, 290, 276, 135, 403/133, 263, 319, 114

[56] References Cited

U.S. PATENT DOCUMENTS

| | | | |
|---|---|---|---|
| 3,151,897 | 10/1964 | Wagner | 403/135 |
| 4,410,295 | 10/1983 | Ersoy et al. | 403/135 |
| 4,733,625 | 3/1988 | Allen | 403/289 |
| 4,765,199 | 8/1988 | Anderson et al. | 403/290 |
| 4,895,472 | 1/1990 | Dony et al. | 403/135 |
| 5,153,976 | 10/1992 | Benchaar et al. | 403/135 |

FOREIGN PATENT DOCUMENTS

| | | |
|---|---|---|
| 0313779 | 5/1989 | European Pat. Off. . |
| 356750 | 8/1989 | European Pat. Off. . |
| 2351350 | 5/1976 | France . |
| 2619539 | 2/1989 | France . |
| 1580182 | 11/1980 | United Kingdom ................ 403/135 |
| 2225632 | 11/1989 | United Kingdom . |

Primary Examiner—John T. Kwon

[57] ABSTRACT

A device for mounting a mobile part of an automobile vehicle headlight on a relatively fixed part comprises a generally spherical head joined to a first part by means of a rod. A substantially complementary cavity is fastened to the second part. The head is forced fitted into the cavity through an opening into the latter. At least one flexible tongue is provided in the vicinity of the cavity and is adapted to deform elastically to enable insertion of the head therein and, after such insertion, to impede extraction of the head from the cavity. The cavity defines a stable position for the head in which the flexible tongue(s) are not in contact with the head. The device is used to adjust the reflectors relative to the headlight units.

13 Claims, 2 Drawing Sheets

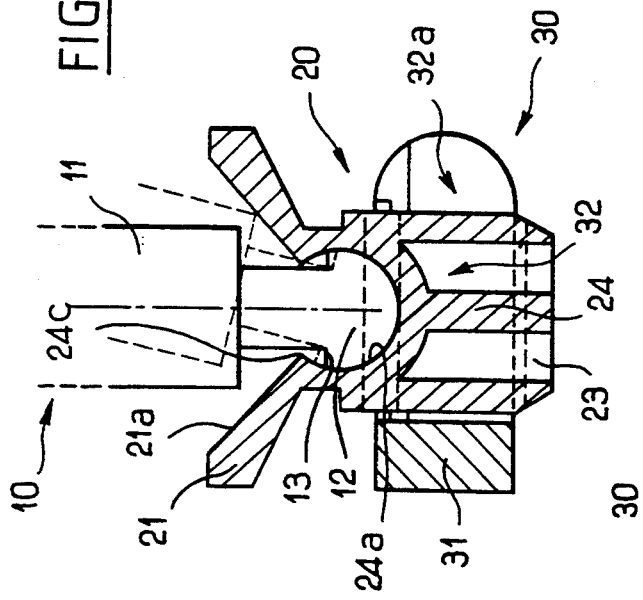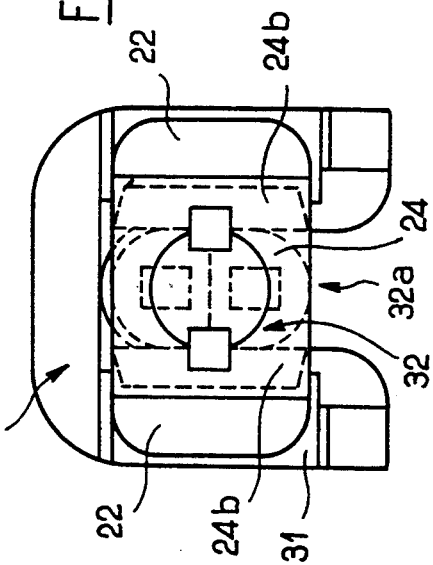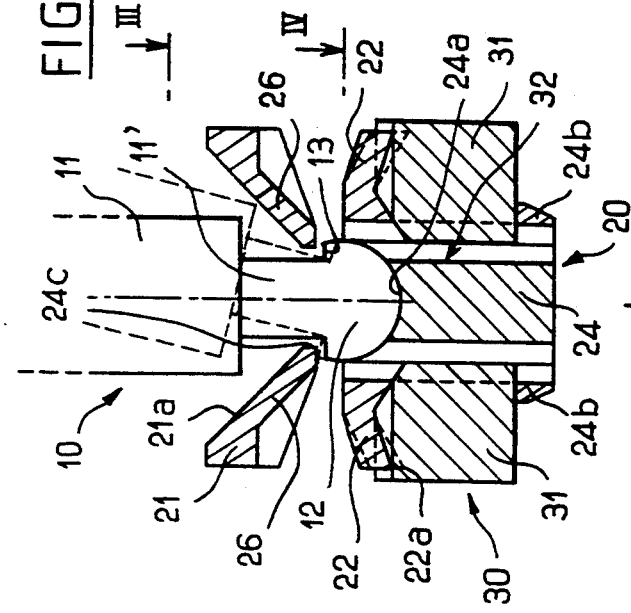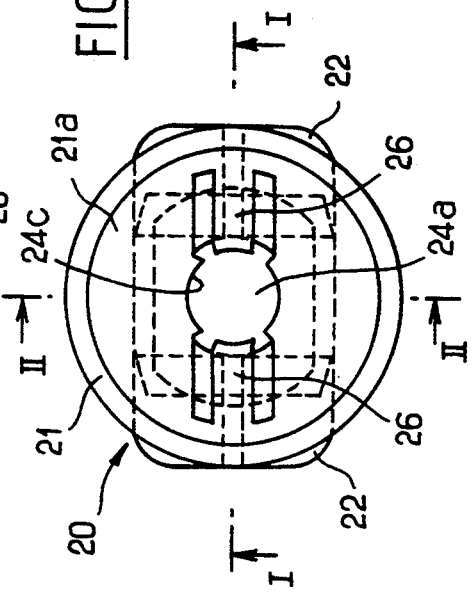

5,443,323

MOUNTING DEVICE FOR A MOBILE PART OF A HEADLAMP

BACKGROUND OF THE INVENTION

1. Field of the Invention

The present invention concerns ball-joint devices and in particular devices for mounting a mobile part of a headlamp, such as a reflector, on a relatively fixed part to enable adjustment of the mobile part.

2. Description of the Prior art

Conventionally a mobile part of this kind has a plurality of (typically three) spherical cavities adapted to receive complementary spherical heads at the end of screwthreaded rods or the like. Rotation of one rod causes axial displacement of the head and thus pivoting of the mobile part, for example to adjust the lightbeam emitted by the headlamp in bearing and in azimuth.

The head is conventionally forced or "snapped" into its cavity during assembly, the walls of the cavity having the elasticity required to allow this and then to hold the head so that its movements are effectively transmitted to the mobile part.

It is known for the cavity to be defined by an intermediate member or capsule attached to the mobile part to which it is clipped by flexible lugs or the like providing mutual inter-engagement.

The document FR-A-2 351 350 discloses a construction of this type.

This prior art construction has a number of drawbacks, however. Firstly, the clipping of the capsule to the mobile part such as a reflector usually results in some play or clearance which causes undesirable variations in the effective orientation of the beam. Also, there may additionally be play between the spherical head and its cavity. Moreover, the flexibility of the capsule material, which is necessary to allow the previously mentioned snap action, is such that there is a high risk of the head separating from the capsule if excessive loads are exerted on these members, in particular when the mobile part reaches the end of its authorized travel.

The document EP-A-0 356 750 describes a ball-joint device intended to avoid this problem in which flexible non-return lugs are provided for holding the spherical head at the bottom of its seat.

This prior art solution effectively reduces the risk of separation but as the non-return lugs are normally in contact with the ball and therefore in part define the seat for said ball, any manufacturing tolerance or clearance between these lugs and the bottom of the seat in turn causes clearance in the positioning of the ball, which is undesirable for the reasons stated above.

The present invention is intended to alleviate these drawbacks of the prior art.

SUMMARY OF THE INVENTION

The present invention consists in a device for mounting a mobile part of an automobile vehicle headlight on a relatively fixed part comprising a generally spherical head joined to a first part by means of a rod and a substantially complementary cavity fastened to the second part, said head being forced fitted into the cavity through an opening into the latter, at least one flexible tongue being provided in the vicinity of said cavity and adapted to deform elastically to enable insertion of the head therein and, after such insertion, to impede extraction of the head from the cavity, said cavity defining a stable position for the head in which said at least one flexible tongue is not in contact with said head.

Preferably, the distance between said at least one flexible tongue and said head in said stable position of said head is such that when said head is moved in response to the application of a traction load such that said at least one tongue comes into play the walls of said cavity still exert a force tending to return said head into said stable position.

The invention also consists in a device for mounting a mobile part of an automobile vehicle headlight on a relatively fixed part comprising a generally spherical head joined to a first part by means of a rod and a substantially complementary cavity joined to the second part, said head being forced fitted into said cavity through an opening into the latter, wherein said cavity and said opening are defined by an intermediate member attached to said second part, said intermediate member is engaged in a housing provided on said part in a direction essentially transverse to the direction of the rod and at least one flexible lug is provided on said intermediate member to fasten said intermediate member and said part together without play.

Finally, the invention consists in an intermediate member for mounting a mobile part of an automobile vehicle headlight on a relatively fixed part wherein a generally spherical head is joined to a first part by means of a rod and a substantially complementary cavity is joined to the second part, said head being forced fitted into said cavity through an opening in the latter, said member comprising a body defining said cavity and adapted to be engaged in a housing of said second part, at least one flexible lug projecting from said body and adapted to cooperate elastically with a surface adjoining said housing to eliminate play between said intermediate member and said second part, and at least one flexible tongue being joined to said body, extending to the vicinity of said opening and being adapted to deform elastically towards said cavity to enable fitting of said head into said cavity and to impede extraction of said head from said cavity.

The at least one flexible lug preferably extends in a direction substantially transverse to a direction of insertion of said head.

Other aspects, objects and advantages of the present invention will emerge from the following detailed description of a preferred embodiment of the invention given by way of example only and with reference to the appended drawings.

BRIEF DESCRIPTION OF THE DRAWINGS

FIG. 1 is a view of a head, capsule and reflector mount assembly in accordance with the invention in vertical axial cross-section on the plane I—I in FIG. 3.

FIG. 2 is a view in axial horizontal cross-section on the plane II—II in FIG. 3.

FIG. 3 is an end view as seen in the direction of the arrow III in FIG. 1.

FIG. 4 is a view as seen in the direction of the arrow IV in FIG. 1.

DETAILED DESCRIPTION OF THE INVENTION

Figure 5A:
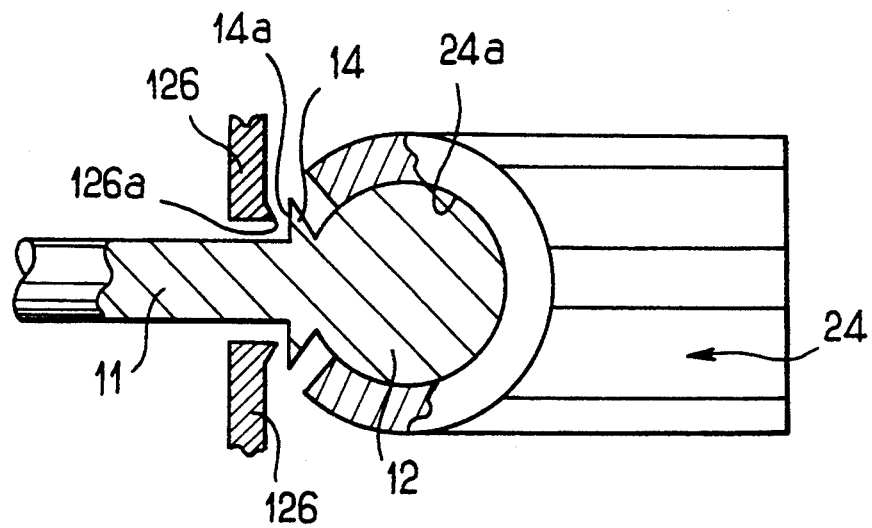
FIGS. 5a through 5c are schematic representations of three different embodiments of the present invention.

Referring to FIGS. 1 through 4, an adjuster rod 10 is designed to be moved axially to vary the orientation of a vehicle headlight reflector. The rod 10 has an externally threaded part 11 adapted to cooperate with a screwthread provided in a housing of the headlamp, a generally spherical part 12 at the free end of the part 11 and an operating part (not shown) at the other end of the rod 10 for rotating it to carry out the adjustment.

A (usually molded) mount 30 with a reflector on its rear surface enables attachment to said reflector of an intermediate part or capsule 20 which is preferably molded in one piece and whose essential function is to define a spherical cavity for the head 12 attached to the reflector.

To this end the mount 30 includes a body 31 in which there is a housing 32 closed at one side and open at the opposite side (32a). The housing 32 preferably extends laterally in a general direction substantially transverse to the axis of the rod 10 and has a particular height and a particular width. The housing 32 is adapted to receive a body of the capsule 20 with extremely limited play, as will be explained later.

The width of the body 24 of the capsule 20 is equal to or very slightly less than that of the housing 32. It defines a central spherical cavity 24a for the head 12 of the rod 10. The part of the body 24 opposite the cavity 24a defines two substantially rigid lateral teeth 24b (FIGS. 1 and 2) in the form of outwardly increased thickness portions adapted to engage with the surface of the body 31 bordering the housing 32 and on the side opposite the rod 10.

Two bent flanges 22 extend laterally from the body 24, substantially level with the spherical cavity 24a. They are adapted to deform elastically when the body 24 is inserted in the housing 32 to provide a dovetail type joint without any play between the mount 30 and the capsule 20. The rest position of the flanges 22 is shown in dashed outline in FIG. 1. The thickness of the body 1 is such that when the capsule and the mount are assembled together as the body 24 is slid into the housing 32 through its entry 32a the flanges 22 are deflected elastically, in the upward direction as seen in FIG. 1, by the surface of the body 31 of the mount facing towards the rod 10. The edge 22a of the flanges 22 exerts a continuous return force on said surface of the body 31 to immobilize the mount and the capsule in the direction of the axis of the rod 10.

Note that the transverse mounting of the capsule 20 on the mount 30 could advantageously be used with any type of ball-joint mounting device, whether or not it has the particular features disclosed hereinafter.

According to another feature of the invention the capsule 20 has a cone-shape or ring-shape part 21 around an opening 24c into the spherical cavity 24a (FIGS. 1, 2 and 3). The inside surface 21a of this part 21 guides the spherical head 12 into alignment with the opening 24c when the reflector is mounted on a plurality of (usually three) spherical heads 12 by means of the commensurate number of capsules 20. Note that two diametrally opposed flexible tongues 26 are defined in the ring 21 and that the distance between their facing ends is less than the diameter of the head 12 and slightly greater than the diameter of an intermediate part 11' between said head 12 and the threaded part 11. In conjunction with this arrangement the spherical head 12 comprises in the transition region with the intermediate part 11' an annular shoulder 13 in a plane perpendicular to the axis of the rod 10.

When the head 12 is inserted into the respective cavity 24a by application of an external axial load, said head passes the facing edges of the tongues 26 which temporarily deform elastically inwards (downwards in FIG. 1) to allow this. As soon as the shoulder 13 has passed the tongues, the latter return to their rest position (FIGS. 1 and 2). During this same movement the head 12 is snapped into the cavity 24a. Note that the cavity 24a is adapted to procure this snap action of its own accord. To be more precise, the ends of the tongues 26 when in the rest position are not in contact with the shoulder 13 when the head is snapped into the cavity. As will emerge later, the essential object of these tongues is to oppose extraction of the head 12 from its cavity.

To be more precise, the distance between the ends of the tongues 26 and the shoulder 13 in the rest position is such that if a traction force is applied to the rod 10 which tends to extract the head 12 from the cavity 24a the shoulder 13 abuts against the end parts of the tongues 26 but the head 12 has yet to pass the point of maximum resistance beyond which it is no longer retained by the walls of the cavity. Note that the tongues 26 cannot deform elastically outwards (upwards in FIG. 1) because the circular arc defined by their free edges rapidly intersect the edges of the intermediate part 11' which then prevents such movement. Thus the tongues 26 firmly limit the extraction travel to a position of the rod and of the head such that the walls of the cavity 24a continue to exert a return force urging the head into its designed position within the cavity.

In this device the tongues 26 prevent unwanted unsnapping of the head 12 without being in contact with the shoulder 13 under normal circumstances and without contributing to retention of the head. Accordingly, the inclination of the rod 10 can be varied within certain limits as shown in dashed outline in FIGS. 1 and 2 without the shoulder 13 impeding this.

Figure 5B:
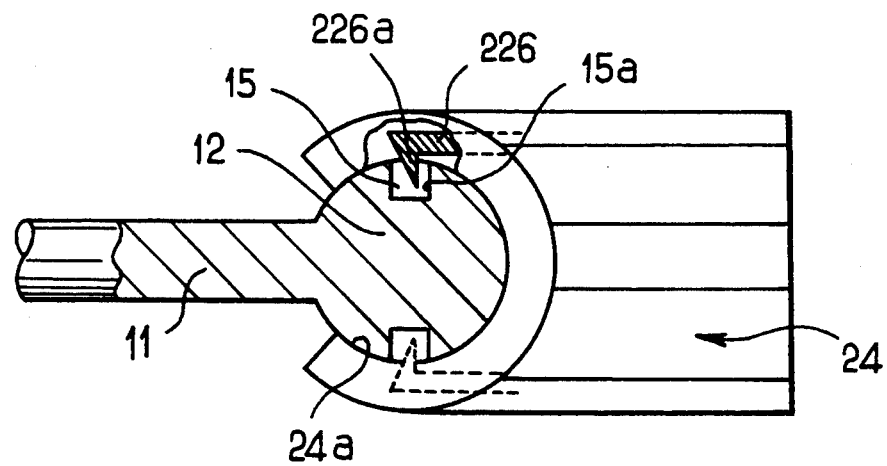
Figure 5C:
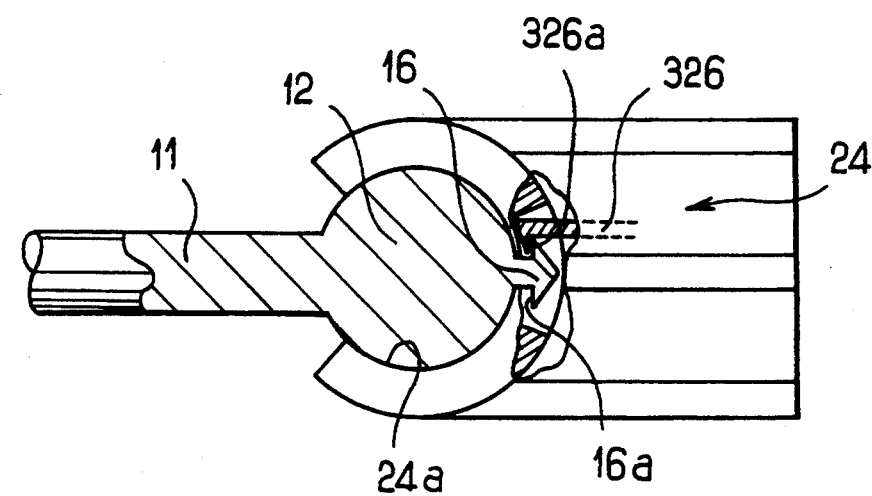

Different embodiments of the invention are shown in FIGS. 5a through 5c. Parts identical or similar to those in the previous figures are identified by the same reference numbers.

In FIG. 5a the rod 11 has in the region of transition with the head 12 a generally triangular cross-section flange 14 whose side 14a facing towards the rod is generally plane and perpendicular to the rod axis.

The body 24 defining the spherical cavity 24a carries adjacent the cavity opening two opposed tongues 26 directed generally towards each other and each having a triangular extension 126a directed towards the aforementioned surface 14a.

The two tongues 126 define between them a free space that is wider than the diameter of the rod 11 to enable angular movement of the rod.

At rest, the ends of the two extensions 126a are at a certain distance from the surface 14a. Once again, angular movement of the rod 12 is allowed.

If traction is applied to the rod 11 (towards the left in the figure) the head 12 begins to leave its cavity 24a until the surface 14a contacts the extensions 126a of the tongues. In a manner similar to the FIGS. 1 through 4 situation, the tongues impede further movement of the rod 11 and the head 12 towards the left and the walls of the cavity 24a continue to exert a force which returns the head 12 to its designed position as soon as the traction load is reduced or removed.

Referring now to FIG. 5b, a circumferential groove 15 is provided in the head 12 in a plane perpendicular to the axis of the rod 11. This groove is delimited on the side towards the free end of the head (the righthand side in the figure) by an annular plane surface. Two tongues 226 extend into respective diametrally opposite regions of the cavity 24a and each comprises a tooth 226a which has a straight abutment surface and which projects into said cavity and engages in the groove 15.

At rest the abutment surface of each tooth 226a is spaced from the surface 15a of the groove and the teeth do not impede variations in the inclination of the rod 11 carrying the head 12.

If traction is applied to the rod 11 the teeth 226a oppose movement of the surface 15a of the groove to limit the extraction movement to a position such that the walls of the cavity 24a return the head 12 to its designed position in the cavity when the traction load is reduced or removed.

Note that the bevelled side of the teeth 226 facing towards the opening of the cavity 24a initially enables forced fitting of the head 12 into the cavity 24a by pushing the tongues 226 outwards.

Referring to FIG. 5c, the head 12 has at its free end a projecting nipple 16 which has a conical exterior surface and a generally plane interior surface 16a perpendicular to the axis of the rod 11. The back of the cavity 24a has a recess into which the nipple 16 can penetrate when the head 12 is snapped into its housing. At least one (preferably two) flexible tongues 326 project into the recess and have a tooth 326a at the end adapted to cooperate through an abutment edge with the surface 16a of the nipple.

At rest, as shown, there is a gap between the abutment edge of the tooth 326a and the abutment surface 16a and the inclination of the rod and the head can vary without impediment.

If traction towards the left is applied to the rod 11 the abutment edge and the abutment surface previously mentioned abut against each other to limit translatory movement of the head 12 to a position such that the walls of the cavity 24a return the head to its designed position immediately the traction load is reduced or removed.

Of course, the present invention is not limited to the embodiment described hereinabove and shown in the drawings. Many variants or modifications within the scope of the invention may suggest themselves to the man skilled in the art.

There is claimed:

1. Device for mounting a mobile part of an automobile vehicle headlight on a relatively fixed part comprising a generally spherical head joined to a first of these parts by means of a rod and a substantially complementary cavity fastened to the other part, said head being snap fitted into said cavity through an opening of said cavity, at least one flexible tongue being provided in the vicinity of said cavity and adapted to deform elastically to enable insertion of said head therein and, after such insertion, to impede extraction of said head from said cavity, said cavity defining for said head a stable snap-fit position in which said at least one flexible tongue is not in contact with said head.

2. Device according to claim 1 wherein the distance between said at least one flexible tongue and said head in said stable position of said head is such that when said head is moved in response to the application of a traction load and said at least one tongue comes into play, the walls of said cavity still exert a force tending to return said head into said stable position.

3. Device according to claim 2 wherein said head has a generally annular shoulder adapted to cooperate with said at least one tongue to impede extraction.

4. Device according to claim 3 wherein said shoulder is in a transition region between said head and said rod.

5. Device according to claim 4 wherein said shoulder is on a flange projecting from said rod.

6. Device according to claim 3 wherein said shoulder is in a circumferential groove in said head, said at least one tongue comprising a projection disposed in said groove when said head is in place in said cavity.

7. Device according to claim 3 wherein said shoulder is on a nipple on the side of said head opposite said rod, said cavity has at the back a recess adapted to receive said nipple and said at least one flexible tongue projects into said recess and comprises a tooth adapted to cooperate with said shoulder.

8. Device according to claim 1 comprising two diametrically opposed flexible tongues.

9. Device according to claim 1 wherein said at least one flexible tongue is defined by a cut-out region of a flared guide part surrounding said opening of said cavity.

10. Device for mounting a mobile part of an automobile vehicle headlight on a relatively fixed part comprising a generally spherical head joined to a first of these parts by means of a rod and a substantially complementary cavity joined to the other part, said head being forced fitted into said cavity through an opening of said cavity, wherein said cavity and said opening are defined by a connecting member attached to said other part, said connecting member is engaged in a housing provided on said other part in a direction essentially transverse to the direction of the rod and at least one flexible lug is provided on said connecting member to fasten said connecting member and said other part together without play.

11. Device according to claim 10 comprising two flexible lugs in a first region of a body of said connecting member adapted to be received in said housing, said lugs being adapted to be deformed elastically by respective first surfaces of said other part on either side of said housing and wherein said body comprises in a second region opposite said first region relative to said housing two substantially rigid teeth cooperating with respective second surfaces on either side of said housing and opposite respective first surfaces.

12. A connecting member for mounting a mobile part of an automobile vehicle headlight on a relatively fixed part wherein a generally spherical head is joined to a first of these parts by means of a rod and a substantially complementary cavity is joined to the other part, said head being forced fitted into said cavity through an opening of said cavity, said connecting member comprising a body defining said cavity and adapted to be engaged in a housing of said other part, at least one flexible lug projecting from said body and adapted to cooperate elastically with a surface adjoining said housing to eliminate play between said connecting member and said other part, and at least one flexible tongue being joined to said body, extending to the vicinity of said opening and being adapted to deform elastically towards said cavity to enable fitting of said head into said cavity and to impede extraction of said head from said cavity.

13. A connecting member according to claim 12 wherein said at least one flexible lug extends in a direction substantially transverse to a direction of insertion of said head.

* * * * *